United States Patent [19]

Norem et al.

[11] 3,732,722

[45] May 15, 1973

[54] MATERIAL HOLDER

[75] Inventors: Stanley D. Norem, Bayside, N.Y.;
Michael J. O'Neill, West Redding;
Robert S. Richmond, Westport, both of Conn.

[73] Assignee: The Perkin-Elmer Corporation, Norwalk, Conn.

[22] Filed: Aug. 20, 1971

[21] Appl. No.: 173,465

[52] U.S. Cl. .................................................73/15 B
[51] Int. Cl. ............................................G01n 25/00
[58] Field of Search................................73/15, 190

[56] References Cited

UNITED STATES PATENTS

| 3,524,340 | 8/1970 | Kocherzhinsky et al. | 73/15 |
| 3,293,909 | 12/1966 | Gledhill | 73/15.6 |
| 3,011,351 | 12/1961 | Bergsma | 73/519 |

OTHER PUBLICATIONS

Garn et al., "Analytical Applications of a Differential Thermal Analysis Apparatus" in Analytical Chemistry, Vol 29 No. 2 Feb 1957 pg 271–275

Primary Examiner—Herbert Goldstein
Attorney—Edward R. Hyde Jr.

[57] ABSTRACT

A material holder for a differential scanning calorimeter includes a heater element and a sensor element, both selected to exhibit substantially the same predetermined thermal coefficient of expansion. A cylindrical member for housing the heater and sensor elements is also selected to exhibit substantially the same thermal coefficient of expansion as well as to provide structural rigidity. The cylindrical member is formed from one of the precious metals or an alloy thereof. The heater and the sensor elements are positioned within the cylindrical member by components that electrically isolate the heater element from the sensor element but thermally couple the two together, as well as by components that electrically insulate the heater and the sensor elements from each other and from the cylindrical member but thermally couple the two elements together. The positioning components are also selected to exhibit substantially the same thermal coefficient of expansion as the predetermined coefficient. Thus a plurality of components and elements are assembled in a housing so as to expand and contract substantially coextensively without rupturing. The differential scanning calorimeter may therefore be operated reliably at high temperatures.

12 Claims, 3 Drawing Figures

PATENTED MAY 15 1973 3,732,722

INVENTORS
Michael J. O'Neill
Robert S. Richmond
Stanley D. Norem

BY John T. O'Halloran
ATTORNEY

MATERIAL HOLDER

BACKGROUND OF THE INVENTION

Thermal analysis of materials is based on the fact that thermal energy is absorbed or evolved during physical or chemical changes in the material. A differential scanning calorimeter is a thermal analytical instrument that measures directly the differential energy changes that occur in a sample material, as compared to a reference material, during such physical or chemical changes. In such instruments, a sample material and a thermally inert reference material are placed in separate material holders and are juxtaposed adjacent to each other in the same thermal environment. The environment is then subjected to a programmed change in its temperature. This is accomplished by electrically energizing a heater element built into each material holder. The holder, and consequently the material held therein, are thereby heated.

The absorption or evolution of thermal energy by the sample material during the programmed changes in temperature tends to cause the sample material temperature to momentarily lag or lead the temperature of the reference material. However the temperature of the sample material is maintained in dynamic equilibrium with the temperature of the reference material by means of a feedback loop that differentially controls the thermal energy supplied to both the sample and reference materials. This is accomplished by utilizing the sensor element built into each material holder as one arm of a Wheatstone bridge circuit. Any difference in temperature between the sample and reference materials unbalances the Wheatstone bridge and generates a differential signal. The differential signal is utilized in the feedback loop to change differentially the energy applied by the heater elements to the sample and reference materials to maintain them in equilibrium. An analog measurement of the energy required to maintain the sample and reference material in dynamic equilibrium as a function of time or temperature is recorded on a graphic recorder and provides the output of the calorimeter.

As compared to other thermal instruments, the material holders for differential scanning calorimeters are extremely complex. The inclusion of a miniature heating element and a highly sensitive temperature sensing element in each holder, which elements must be thermally coupled to each other but electrically isolated and insulated from each other, poses a difficult problem in design. Large temperature gradients can exist between the holders and the surrounding areas. Undesirable variations between the sample material holder and the reference material holder cause differential feedback to correct the variation, which produces inaccurate results.

Desirably the sample and reference material holders should be of a low thermal mass to produce rapid heating and cooling so as to provide quick turn-around times. Furthermore the juxtaposition of the heaters and sensor elements close to each other to provide a good thermal coupling places a severe burden on the insulator material included to insulate these elements.

It has also been found that the operation of steel or base-metal alloy material holders at high temperatures tended to cause the surface of the housing of the prior art holders to oxidize, producing undesirable variations in heat transfer to the surrounding areas. Such mistracking produces a disequilibrium that limited the high temperature operation of the differential scanning calorimeter. Furthermore it was also found that operation at higher temperatures caused uneven thermal expansion that tended to destroy the rigidity of the holders and introduced error signals into the output of the calorimeter.

SUMMARY OF THE INVENTION

A material holder embodying the invention is comprised of a plurality of elements, members, and components that perform diverse functions and are composed of a plurality of different materials. However, all of the different materials exhibit substantially the same thermal coefficient of expansion and are selected to exhibit desirable characteristics at high temperatures. The components are joined together in a rigid housing and the heating and cooling of sample and reference material causes the various components of the holders to expand and contract substantially coextensively. Thus rupturing of the holder is prevented when operating at high temperatures. The temperature range of operation of the differential scanning calorimeter is therefore vastly extended.

DETAILED DESCRIPTION OF THE DRAWINGS

Figure 1:
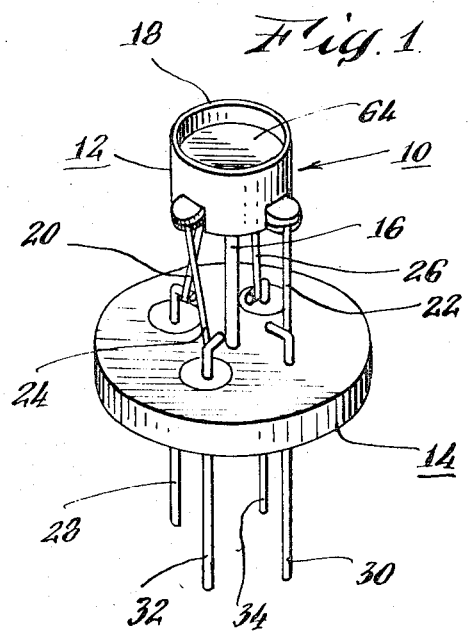
FIG. 1 is an isometric view of a material holder for a differential scanning calorimeter.

Referring to FIG. 1, a material holder 10 for a differential scanning calorimeter includes a cup or housing 12 that is mounted on a base mounting plate 14 by means of a center post 16. The center post 16 may, for example, be soldered at its bottom to a central aperture on the base 14 and electron beam welded at its top to the cup 12. The cup 12 exhibits an inner cavity 18 wherein either sample material or reference material is inserted for testing during the operation of the differential scanning calorimeter. Penetrating through the cup 12 are a pair of sensor wires 20 and 22, as well as a pair of heater wires 24 and 26. Penetrating through the base mounting plate 14 are a pair of feed-through bars 28 and 30 that are welded to the sensor wires 20 and 22 respectively. Similarly a second pair of feed-through bars 32 and 34 penetrate through the base plate 14 and are welded to the heater wires 24 and 26 respectively. The feed-through bar 30 functions as a ground wire that grounds the sensor wire 22 as well as the mounting base plate 14 and cup 12. In the normal environment of the sample holder 10, the cup 12 is hermetically sealed within a temperature controlled cavity (not shown) and the base plate 14 mounts the holder 10 on the calorimeter and comprises a portion of the wall of the cavity. The feed-through bars provide access to electronic circuit connections external to the cavity. The material holder 10 may, for example, comprise the sample holder in a calorimeter. However, the reference material holder in the calorimeter is made substantially identical to the sample holder 10 so that the two holders respond substantially identically to the same stimuli and thereby track each other.

Figure 2:
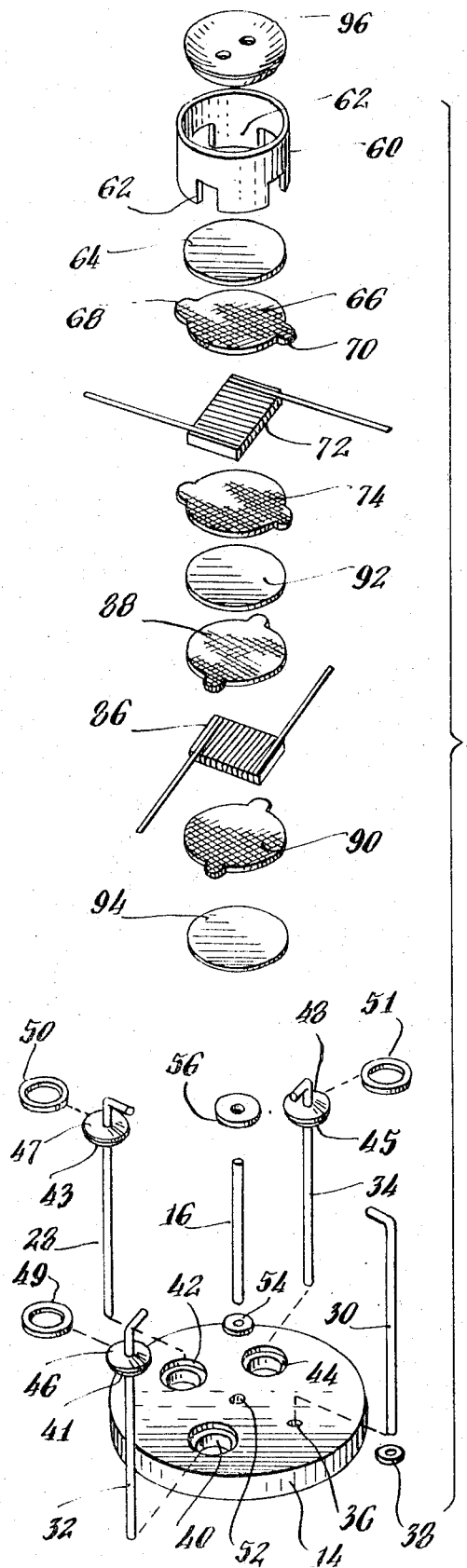
FIG. 2 is an exploded isometric view of the constituent parts of the holder of FIG. 1.

Referring now to FIG. 2, there is shown an exploded view of the sample holder 10 in FIG. 1. The base mounting plate 14 comprises a copper disc having a plurality of apertures. One aperture 36 permits the feed-through bar or ground wire 30 to penetrate through the plate 14. A ground wire preformed solder ring 38 is included in FIG. 2 to illustrate the method of affixing the ground wire 30 to the base plate 14. The apertures 40, 42 and 44 are made substantially larger than the aperture 36 and the base plate 14 includes at the top of each of the apertures 40, 42 and 44 a step-like recess. The apertures are constructed this way so that glass insulator beads 41, 43 and 45 on the feed-through bars 32, 28, and 34 fit snugly into the base plate 14 and insulate the feed-through bars therefrom. Furthermore, parasol-like rims 46, 47 and 48 on each of the feed-through bars 32, 28, and 34 respectively cover the recesses to provide a flush mounting of the feed-through bars on the base plate 14. A plurality of solder preformed rings 49, 50, and 51 are provided for the feed-through bars to solder the feed-through bars to the base plate 14. The ground wire 32 may for example be made of copper, and the feed-through bars 28, 30, and 34 along with the rims 46, 47, and 48 may be made of a glass-sealing alloy such as "Kovar".

The base plate 14 also includes a central recess 52 into which the center post 16 is inserted and affixed to the base plate 14 by means of a preformed solder ring 54. The center post 16 is connected to the cup 12 of the holder 10 by welding a center post washer 56 to the top of the center post 16 and to the outer bottom of the cup 12.

The cup 12 includes a cylindrical member or cup housing 60 that includes a plurality of crenelations 62 that extend substantially half way up the wall of the annular housing 60. A top disc 64 is positioned in the cup housing 60 substantially at the top of the crenelations 62. Such a positioning forms the cavity 18 in the holder 10. The annular housing 60 is selected to be chemically and thermally inert at high temperatures to resist reaction with sample materials and to resist oxidation. The housing 60 is selected from one of the group of precious metals: platinum, palladium, gold, and their alloys. Specifically, the housing 60 is formed of a platinum-20 percent iridium alloy. Such an alloy exhibits a high thermal conductivity and low emissivity and a linear thermal coefficient of expansion at 1,000°K of $10 \times 10^{-6}$. This alloy is also mechanically hard and rigid. The top disc 64 is also made of the same alloy as the housing 60.

An aluminum oxide cloth 66, having a pair of tabs 68 and 70, is positioned below the top disc 64 with the tabs extending through the recesses between the crenelations 62. The alumina cloth 66 for example comprises a cloth that is woven out of aluminum oxide fibers to provide an insulator for sensor element 72. The sensor element 72 is sandwiched intermediate the alumina cloth 66 and a second alumina cloth 74 made identical to the cloth 66.

In addition to alumina, the cloth 66 may also be made of beryllium oxide or titania. The prime requirements are that the material be chemically and thermally inert at high temperatures and exhibit good thermal conduction as well as be a good insulator. The material need not be cloth but cloth offers the added advantage of providing a good ruglike seating for the sensor 72 preventing lateral movement thereof. Alumina exhibits these properties and also a linear thermal coefficient of expansion at 1,000°K of $10 \times 10^{-6}$.

Figure 3:
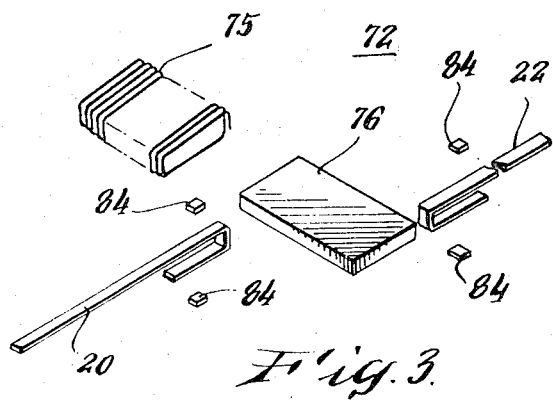
FIG. 3 is an exploded view of the sensor element of the holder of FIG. 1.

As shown in FIG. 3, the sensor element 72 includes a solid aluminum oxide chip 76 on which is wound 24 ½ turns of two thousandths of an inch diameter platinum wire 75. Such a wire exhibits substantially 12 ohms of resistance at 25°C. A pair of platinum ribbons or conductive wires 20 and 22 are soldered to the platinum wire 75 by means of preformed gold foil ribbon solder connections 84.

Referring back to FIG. 2, a heater element 86, which is made substantially identical to the sensor element 72, is sandwiched between a second pair of alumina cloths 88 and 90 that are substantially identical to the first pair of cloths 66 and 74. The tabs on the cloths 88 and 90 are inserted into the other recesses of the cup housing 60. An intermediate disc 92 is inserted between the alumina cloths 74 and 88 to electrostatically shield and isolate the sensor element 72 from the heater element 86. Furthermore a bottom disc 94 is juxtaposed below all of the other components in the housing 60 to provide a rigid structure for the cup 12 as well as to provide a mounting point for the center post 16 and center post washer 56. The discs 92 and 94 are identical to the top disc 64. Covering the various components of the cup 12 is a cup cover 96 that is made of pure platinum. The cover 96 includes a pair of apertures by which it may be picked up and placed on the holder 10 using tweezers after material is inserted into the cavity 18, the floor of which is the disc 64. Said apertures also permit the escape of gaseous decomposition products from certain samples.

The various components shown in FIG. 2 are assembled into a holder 10 as shown in FIG. 1 and operated in a differential scanning calorimeter as described in U.S. Pat. No. 3,263,484. This patent is assigned to the same assignee as the present invention and is herewith incorporated by reference into this application.

It is to be noted that the first and second pairs of alumina cloths are made larger than the sensor and heater elements 72 and 86. This is to insure that these elements are electrically insulated from each other as well as to provide a ruglike foundation for the elements to prevent lateral movement thereof. The tabs of the cloths also extend through the recesses between the crenelations 62 in the annulus 60 to insulate the heater and sensor wires from the annulus 60. Furthermore, the disc 92 is selected to electrostatically shield or isolate the heater and sensor elements from each other. However, the discs and the cloths also have to thermally couple the heater and sensor elements.

It is also to be noted that in the assembling of the holder 10 the various components of the cup 10 are solderlessly joined to each other. Thus the disc 64 is electron beam welded to the annular housing 60 and the sensor 72 is sandwiched between the alumina cloths 66 and 74 which are in turn sandwiched between the discs 64 and 92. The disc 92 is also electron beam welded to the housing 60. Furthermore the bottom disc 94 is electron beam welded to the housing 60 with the heater 86 and alumina cloths 88 and 90 sandwiched above it. The center post 16, which is hollow, is made of platinum-20 percent iridium alloy and so is the center post washer 56. They are electron beam welded to each other and to the disc 94. Thus a mechanically rigid holder is provided and no foreign material such as solder is used to join the material together. Thus solderless connections keep the sample holder together.

Platinum exhibits a linear thermal coefficient of expansion at 1,000°K of $10.8 \times 10^{-6}$. Platinum-iridium alloy exhibits substantially the same thermal coefficient of expansion. Similarly the cloths 66, 74, 88, and 90 and the heater and sensor chips 76 are made of alumina, which exhibits substantially the same thermal coefficient of expansion. Thus all of the components of the cup 12 exhibit a thermal expansion and contraction that is substantially coextensive with each other. Consequently no rupturing occurs when operating at high temperatures.

Thus, in accordance with the invention, a material holder is provided that permits the upper range of operation of a differential scanning calorimeter to be increased from approximately 500°C to substantially 725°C. Furthermore the operation is reliable and accurate at these high temperatures. This permits the differential scanning calorimeter to perform direct specific heat measurements over this extended temperature range, which was substantially impossible heretofore.

We claim:

1. A material holder for a differential scanning calorimeter that is operated at high temperatures, comprising in combination:
   heater and sensor elements selected to exhibit substantially the same predetermined thermal coefficient of expansion,
   a substantially cylindrical cup housing including a sample support surface made of a first material that differs from the material from which said elements are made but exhibiting substantially the same thermal coefficient of expansion as said predetermined coefficient, and
   means for positioning said heater and sensor elements within said cup housing,
   said positioning means selected to exhibit substantially the same thermal coefficient of expansion as said predetermined coefficient so that the heating and cooling of said material holder causes the individual components of said holder to expand and contract substantially co-extensively so as to avoid rupturing said holder.

2. The combination in accordance with claim 1 wherein said cup housing comprises:
   an annulus having a plurality of crenelations, and
   said heater and sensor elements each include a pair of electronically conductive wires that penetrate through said crenelations to the outside of said annulus.

3. The combination in accordance with claim 2 wherein said positioning means includes isolating means for electrically isolating said heater element from said sensor element.

4. The combination in accordance with claim 3 wherein said positioning means further includes insulating means for insulating said heater element and said sensor element from each other and from said annulus.

5. The combination in accordance with claim 4 wherein said insulating means includes
   a first pair of insulator cloths for sandwiching said heater element therebetween, and
   a second pair of insulator cloths for sandwiching said sensor element therebetween.

6. The combination in accordance with claim 5 wherein each of said insulators includes a pair of tabs for insertion into said crenelations for properly positioning said insulators.

7. The combination in accordance with claim 6 wherein each of said insulators comprises an alumina woven cloth for thermally coupling said sensor element to said heater element and for electrically insulating said heater element from said sensor element.

8. The combination in accordance with claim 5 wherein said isolating means comprises an electrically and thermally conductive disc positioned intermediate said first and second pairs of insulator cloths to electrostatically shield said heater element from said sensor element but to thermally couple said elements together.

9. The combination in accordance with claim 8 wherein said positioning means further includes a pair of discs substantially identical to said intermediate disc and positioned on the top and bottom of said annulus to compress said insulators and said elements together.

10. The combination in accordance with claim 9 wherein said annulus and said discs are selected to be made of a platinum-iridium alloy and said heater and sensor elements each include a chip of alumina having a plurality of turns of platinum wire wound therearound.

11. A material holder for a differential scanning calorimeter that is operated at high temperatures, comprising in combination
    heater and sensor elements made of a non-precious material
    a housing member including a sample support surface made of a metal selected from a group of precious metals and alloys thereof, and
    means for positioning said heater and sensor elements with said member
    said positioning means, heater and sensor elements and said housing each selected to exhibit substantially the same thermal coefficient of expansion so that the heating and cooling of said material holder causes the individual components of said holder to expand and contract substantially coextensively so as to avoid rupturing said holder.

12. The combination in accordance with claim 11 wherein said housing member is selected from a precious metal group consisting of platinum, palladium, gold and alloys thereof.

* * * * *